(No Model.)

C. R. KNAPP.
VACUUM PRESS PERCOLATOR.

No. 293,335. Patented Feb. 12, 1884.

Witnesses:
Wm. M. Brown, M.D.
Henry Philip Dalton

Inventor:
Charles Richard Knapp.

UNITED STATES PATENT OFFICE.

CHARLES RICHARD KNAPP, OF SAN FRANCISCO, CALIFORNIA.

VACUUM-PRESS PERCOLATOR.

SPECIFICATION forming part of Letters Patent No. 293,335, dated February 12, 1884.

Application filed March 2, 1883. (No model.)

*To all whom it may concern:*

Be it known that I, CHARLES RICHARD KNAPP, a citizen of the United States, residing at San Francisco, in the county of San Francisco and State of California, have invented a new and useful Improvement in Vacuum-Press Percolators, of which the following is a specification.

The nature of my invention consists of an improvement in the construction of vacuum-percolators, whereby I utilize the transmitted power of atmospheric pressure by the use of an elastic diaphragm, separating the normal atmosphere from a vacuum created within a suitable air-tight jar, in the interior upper part of which is suspended a porous conical bag, holding drug or other substance, so arranged as to be subject to the pressure of the diaphragm for the purpose of separating volatile, gaseous, liquid, or soluble matter from solid or insoluble matter.

Figure 1:
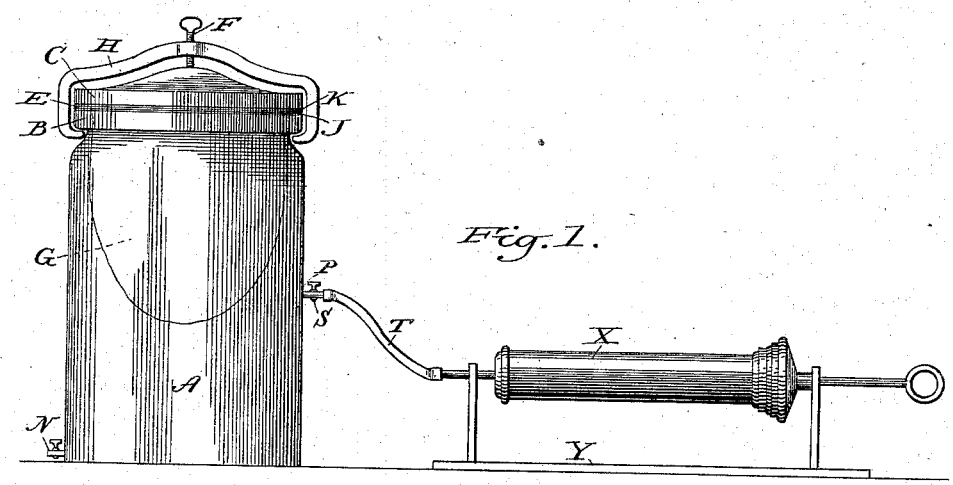
Figure 2:
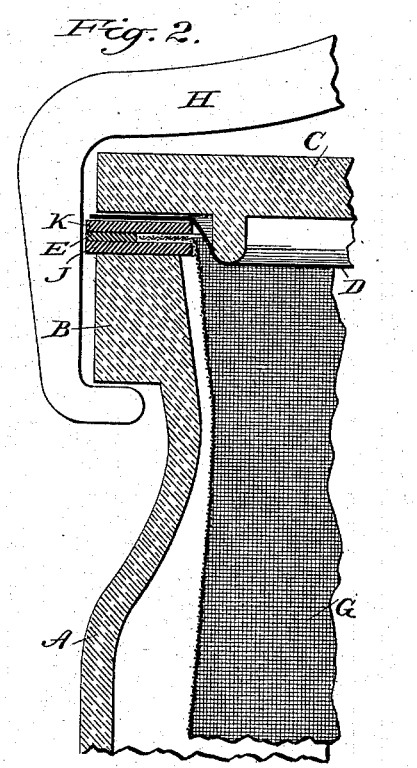
Figure 3:
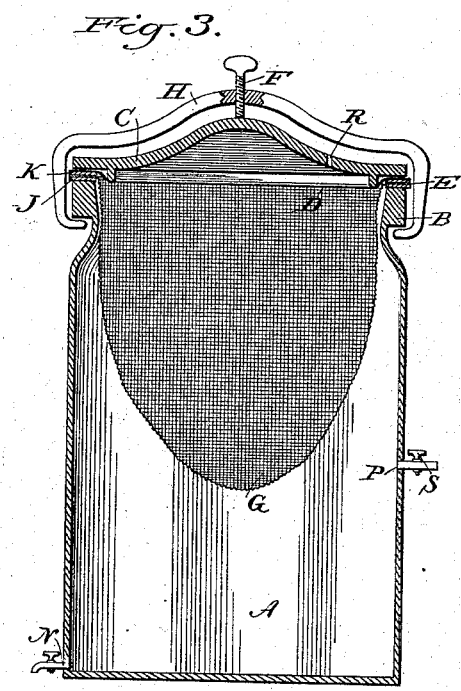

In the accompanying drawings, Figure 1 is a plan view of the entire machine; Figs. 2 and 3, sectional views of the same.

The wide-mouth jar A, made of air-tight material, is provided with lip B, and connected with an air-pump by exhaustion-tube P. The porous conical bag G occupies the upper part of the inside of jar A, suspended from lip B.
The cover C is perforated by air-hole R. The elastic india-rubber diaphragm D is placed over the mouth of jar A, and is held air-tight between lip B and rim of cover C.

The mode of operating the machine and utilizing my invention is as follows: The drug or other substance subjected to my process of vacuum-press percolation is placed in porous conical bag G, suspended in jar A, and the elastic india-rubber diaphragm D is spread over the drug or other substance and covering air-tight at lip B. The wide mouth of jar A is held in position by rim of cover C. Vacuum being created in jar A by an air-pump or other means through exhaustion-tube P, the latent atmospheric power is liberated, and the elastic india-rubber diaphragm D, being subject to the action of vacuum from below and atmospheric pressure from above, admitted through air-hole R, is caused to press upon the upper surface of drug or other substance subject to extraction with the pressure of fifteen pounds to the square inch of surface exposed, thereby causing the soluble or liquid matter holding in solution the medicinal active principles and volatile essential aromas to flow out of the solid or insoluble matter and down into the lower part of jar A.

What I claim as my invention, and desire to secure by Letters Patent of the United States, is—

The combination of an elastic diaphragm, made of india-rubber or other suitable elastic material, separating the normal atmosphere from a vacuum created within a glass jar or other suitable air-tight vessel, in the interior upper part of which is suspended a porous conical bag, holding drug or other substance, so arranged as to be subject to the pressure of the diaphragm, transmitting atmospheric weight, for the purpose of separating volatile, gaseous, liquid, or soluble matter from solid or in soluble matter.

CHARLES RICHARD KNAPP.

Witnesses:
WILLIAM MAINLAND BROWN,
HENRY PHILIP DALTON.